(12) United States Patent
Nondahl et al.

(10) Patent No.: US 7,215,559 B2
(45) Date of Patent: May 8, 2007

(54) METHOD AND APPARATUS TO REDUCE COMMON MODE VOLTAGES APPLIED TO A LOAD BY A DRIVE

(75) Inventors: Thomas Arthur Nondahl, Wauwatosa, WI (US); Rajendra Naik, New Berlin, WI (US); Rangarajan Madapusi Tallam, Oak Creek, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 51 days.

(21) Appl. No.: 10/952,012

(22) Filed: Sep. 28, 2004

(65) Prior Publication Data

US 2006/0067092 A1    Mar. 30, 2006

(51) Int. Cl.
*H02M 3/24*    (2006.01)
*H02M 5/42*    (2006.01)

(52) U.S. Cl. .................... 363/37; 363/98; 327/551; 327/552

(58) Field of Classification Search ............ 363/37, 363/39, 40, 98, 132; 327/551, 552
See application file for complete search history.

(56) References Cited

U.S. PATENT DOCUMENTS 4,542,330 A    9/1985    Terbrack (Continued)

FOREIGN PATENT DOCUMENTS

TW    439350    6/2001

OTHER PUBLICATIONS

Mario Cacciato, et al; Reduction Of Common-Mode Currents In PWM Inverter Motor Drives; IEEE Transactions on Industry Applications, vol. 35, No. 2, pp. 469-476, Mar./Apr. 1999.

(Continued)

*Primary Examiner*—Bao Q. Vu
(74) *Attorney, Agent, or Firm*—Charles & Brady LLP; Alexander M. Gerasimow

(57) ABSTRACT

A method and apparatus for reducing common mode voltage applied to a load by a drive, the drive including a rectifier linked between three AC supply lines and positive and negative DC buses that converts AC supply voltage to DC voltage across the DC buses and an inverter linked between the DC buses and a load, the rectifier providing a DC input voltage to the inverter wherein, during normal operation, the inverter is capable of generating maximum inverter output voltages given a specific DC bus voltage, the method comprising the steps of controlling the inverter to supply output voltages to the load where the output voltage are substantially free of common mode voltage and such that the maximum inverter output voltage is less than the maximum inverter output voltage during normal inverter operation and given a specific DC bus voltage and controlling the rectifier to convert the supply voltage to DC voltage across the DC buses and so that the DC bus voltage is boosted to a level more than greater than the peak three phase AC input voltage that will be least substantially compensate for the drop in maximum inverter output voltage.

23 Claims, 6 Drawing Sheets

U.S. PATENT DOCUMENTS

| | | | |
|---|---|---|---|
| 4,677,367 | A | 6/1987 | Goodman |
| 5,831,842 | A * | 11/1998 | Ogasawara et al. .......... 363/40 |
| 5,936,856 | A * | 8/1999 | Xiang .......................... 363/98 |
| 5,956,244 | A | 9/1999 | Rehm et al. |
| 6,031,738 | A | 2/2000 | Lipo et al. |
| 6,185,115 | B1 | 2/2001 | Sul et al. |
| 6,307,760 | B1 | 10/2001 | Ikimi |
| 6,636,107 | B2 * | 10/2003 | Pelly .......................... 327/552 |
| 6,775,157 | B2 * | 8/2004 | Honda ......................... 363/39 |
| 6,794,929 | B2 * | 9/2004 | Pelly .......................... 327/552 |
| 6,842,354 | B1 * | 1/2005 | Tallam et al. ................ 363/98 |
| 6,898,092 | B2 * | 5/2005 | Briere et al. ................. 363/39 |
| 2004/0130923 | A1 | 7/2004 | Yin Ho et al. |

OTHER PUBLICATIONS

A.M. De Broe et al; Neutral-to-Ground Voltage Minimization In a PWM-Rectifier/Inverter Configuration; Power Electronics and Variable Spped Drives; Sep. 23-25, 1996, pp. 564-568; conference Publication No. 429.

Hyeoun-Dong Lee et al; A Common Mode Voltage Reduction In Boost Rectifier/Inverter System By Shifting Active Voltage Vector In A Control Period; IEEE Transactions On Power Electronics, vol. 15, No. 6, Nov. 2000, pp. 1094-1101.

Haoran Zhang, et al; Multilevel Inverter Modulation Schemes To Eliminate Common-Mode Voltages; IEEE Transactions on Industry Applications, vol. 36, No. 6, Nov./Dec. 2000; pp. 1645-1653.

P.C. Loh et al; A Reduced Common Mode Hysteresis Current Regulation Strategy for Multilevel Inverters; Department of Electrical and Computer Engineering pp. 576-582.

* cited by examiner

US 7,215,559 B2

METHOD AND APPARATUS TO REDUCE COMMON MODE VOLTAGES APPLIED TO A LOAD BY A DRIVE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates generally to three phase AC drives and more specifically to drive configurations that reduce common mode voltage (CMV) that appears between a neutral point of a stator winding and the frame of a motor or other load.

FIG. 1 illustrates an exemplary AC drive 10 that is linked between a three phase AC source 12 including three supply lines 14, 16 and 18 and a three phase motor 20. AC source 12 includes a supply ground identified by label "g". Drive 10 includes a rectifier 22, positive and negative DC buses 24 and 26, respectively, and an inverter 28. Rectifier 22 is linked between supply lines 14, 16 and 18 and DC buses 24 and 26 and converts AC voltages on lines 14, 16 and 18 to a DC potential across buses 24 and 26. To this end, rectifier 22 may be a diode bridge rectifier, a two-level PWM switching rectifier, a three-level PWM switching rectifier, etc.

Where rectifier 22 is an active switching type, rectifier switches are used to link and de-link the three supply lines 14, 16 and 18 to the positive and negative DC buses 24 and 26 in a sequence that results in DC potential across the buses. To this end, where rectifier 22 is a two-level rectifier, the switches can be controlled to assume any of eight switching states including ppp, ppn, pnp, npp, pnn, npn, nnp and nnn states where a "p" indicates that a phase is linked to positive DC bus 24 and an "n" indicates that a phase is linked to negative DC bus 26. The eight two-level rectifier switching states are illustrated in FIG. 2A along with lines between states that indicate possible transitions. Similarly, where rectifier 22 is a three level switching type, rectifier switches can be controlled to assume any of twenty-seven switching states including ppp, ppn, pnp, npp, pnn, npn, nnp, nnn, ppo, pop, opp, poo, opo, oop, oon, ono, noo, onn, non, nno, ooo, pon, pno, nop, npo, opn and onp states. Here an "o" indicates that a phase is linked to a neutral clamp point of the DC link (i.e., a midpoint between DC bus capacitors 36 and 38 (see FIG. 1)). The twenty-seven three-level switching states are illustrated in FIG. 2B along with lines indicating transitions between states.

Inverter 28 is linked between DC buses 24 and 26 and motor 20 and converts the DC to three phase AC voltages that are provided to motor 20. Here, inverter 28 is of the switching type (e.g., is a two-level PWM or three-level PWM switching inverter). Where inverter 28 is a two-level type, inverter 28 can be controlled to assume any of the eight switching states identified above with respect to the two-level rectifier. Here, however, instead of an "n" and a "p" indicating linkage of an associated supply line to negative DC bus 26 and positive DC bus 24, respectively, an "n" and a "p" indicate linkage of an associated motor phase to negative and positive DC buses 26 and 24, respectively.

Where inverter 28 is a three-level type inverter, inverter 28 can be controlled to assume any of the twenty-seven switching states identified above with respect to the three-level rectifier where an "n", a "p" and an "o" indicate linkage of an associated motor phase to negative bus 26, to positive bus 24 and to reference point "o", respectively.

Referring again to FIG. 2B, the twenty-seven three-level switching states can be divided into sub-sets including small, medium, zero and large voltage vector states. Small vector states include the 12 switching states with one "o" and either two "p"'s or two "n"'s and with two "o"'s and either one "p" or one "n" designations. Medium vector states include all switching states including one "o", one "p" and one "n" designation. Zero vector states include the 3 states with all "o", all "n" or all "p" designations. Large vector states include all states including only "n" and "p" designations and no "o"=designations.

Motor 20 includes three-phase windings that are linked together at a common node identified by label "c". Among other components, motor 20 includes a rotor mounted on bearings for rotation within a stator where the stator is mounted to a motor frame. The frame is electrically linked to supply ground "g" (see again FIG. 1).

As known in the controls art, during switching of an AC drive, common mode voltage (CMV) is generated that appears between the motor common node c and the motor frame or supply ground g. The CMV is characterized by a peak-peak value, a step height and a fundamental frequency. If the peak-peak value surpasses a threshold, a voltage breakover can occur between the rotor bearings and the motor frame thereby causing a current to pass through the bearings to ground. Where the current is excessive, the current has been known to cause damage to the bearings thereby reducing the useful life of the bearings and other associated motor components. To this end, a large step height, high fundamental frequency, and high rate of change (dv/dt) are usually harbingers of a large current through the bearings and thus should be avoided.

Both the rectifier and inverter stages generate CMV. Referring again to FIG. 1, using neutral clamp point o of the DC link as a reference point, the CMV generated by the rectifier and inverter are $v_{og}$ and $v_{co}$, respectively. Thus, the total CMV $v_{cg}$ generated by an AC drive can be expressed as:

$$v_{cg} = v_{og} + v_{co} \qquad (1)$$

In the case of a diode bridge rectifier the CMV has a peak-peak value of approximately 30% of the DC bus voltage and a fundamental frequency of three times the supply frequency. Thus, where the supply frequency is 60 Hz, the fundamental frequency of the CMV is 180 Hz. In the case of a PWM converter (i.e., either a rectifier or an inverter) that uses a switching protocol that includes all possible switching states (i.e., eight and twenty-seven states for two-level and three-level converters, respectively), the CMV has a maximum peak-peak value equal to the DC bus voltage $v_{dc}$ and a frequency at or above the PWM switching frequency. Thus, for a drive configuration including a diode bridge rectifier and a two-level PWM inverter, the total peak-peak CMV is as high as 1.30 times the DC bus voltage $v_{dc}$ with a step height of 0.33 $v_{dc}$. Similarly, for a drive including both a two-level PWM rectifier and a two-level PWM inverter, the total peak-peak CMV may be as high as 2.0 $v_{dc}$ with a step height of 0.33$V_{dc}$.

In the case of a switching type inverter or rectifier, one way to reduce CMV has been to limit the switching states of the drive components. For instance, in a first known case the inverter switches in a configuration including a diode bridge rectifier and a two-level PWM inverter have been controlled to exclude both ppp and nnn switching states. Here, the result is that the total peak-peak CMV is at or above the PWM frequency and has a value of 0.63 $v_{dc}$ which is much lower than the 1.30 $v_{dc}$ value that occurs when the ppp and nnn states are used. In a second known case the inverter switches in a configuration including a diode bridge rectifier and a three-level PWM inverter have been controlled to exclude all but medium vector switching states (i.e., pon, pno, opn, onp, nop and npo). Here the result is that the total CMV has a peak-peak value of 0.30 $v_{dc}$.

Unfortunately, the configurations of each of the first and second known cases above have shortcomings. With respect to the first case where ppp and nnn switching states are excluded when controlling a two-level inverter the inverter output voltage and motor currents can have a large component at the PWM frequency and its multiples, which can increase losses in the inverter and motor.

With respect to the second case where all but medium vector switching states are excluded when controlling a three-level inverter (i.e., where large and small vector states are excluded), the large vectors cannot be used to provide maximum AC output voltage and the maximum inverter output is limited to approximately 87% of the three-phase AC input voltage. In addition, because two phase voltages have to change simultaneously while transitioning for the inverter to change from a first medium vector state to a second medium vector state, spikes occur in the CMV and some additional control scheme has to be adopted to reduce the spikes which further complicates control. Moreover, referring again to FIG. 1, the potentials above and below neutral clamp point "o" cannot be actively balanced using the limited medium vector switching states and have been known to drift during transient conditions.

Thus, it would be advantageous to have a drive configuration and control scheme wherein CMV is minimized while the level of inverter output voltage is maintained at the rated level and where other adverse control affects like unbalanced bus capacitor potentials and CMV spikes are minimized.

BRIEF SUMMARY OF THE INVENTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

It has been recognized that several drive configurations can compensate for the inverter voltage drop that is caused by limited switching protocols thereby providing output voltages having maximum values equal to the three-phase AC input voltage values while still reducing the total peak-peak CMV. To this end, in at least one case a three-level rectifier is included in a drive configuration that is controlled to boost DC bus voltage to compensate for expected inverter voltage drop when a limited switching sequence is used. In other cases a two-level rectifier is used to compensate while in still other cases a diode bridge rectifier and a boost circuit are used to boost the DC bus voltage.

It has also been recognized that where a switching type rectifier is used to boost the voltage, a limited switching protocol can be used to control the rectifier to further limit total peak-peak CMV. For instance, in some cases ppp and nnn switching states are excluded when controlling a rectifier while in other cases either the ppp states or the nnn states are excluded.

Where a three level switching type rectifier is employed, the rectifier can be controlled to actively balance the DC bus capacitor voltages. Similarly, where a dual boost circuit (i.e., a separate boost circuit for each DC bus capacitor) is employed, the dual boost circuit can be controlled to actively balance the DC bus capacitor voltages.

In at least some embodiments a three-phase, three-level neutral point clamped inverter is controlled using a switching protocol that excludes both ppp and nnn switching states which reduces inverter caused CMV without reducing the maximum output voltage level. Here, any rectifier type (i.e., a diode bridge alone, a two-level switching type, a three level switching type, etc.) may be employed and controlled, if possible, to reduce CMV further.

Consistent with the above comments, some embodiments of the invention include a method for reducing common mode voltage applied to a load by a drive, the drive including a rectifier linked between three AC supply lines and positive and negative DC buses that converts AC supply voltage to DC voltage across the DC buses and an inverter linked between the DC buses and a load, the rectifier providing a DC input voltage to the inverter wherein, during normal operation, the inverter is capable of generating maximum inverter output voltages given a specific DC bus voltage, the method comprising the steps of controlling the inverter to supply output voltages to the load where the output voltages are substantially free of common mode voltage and such that the maximum inverter output voltage is X % less than the maximum inverter output voltage during normal inverter operation and given a specific DC bus voltage and controlling the rectifier to convert the supply voltage to DC voltage across the DC buses and so that the DC bus voltage is boosted to a level more than X % greater than the peak three phase AC input voltage.

In at least some cases the step of controlling the rectifier to boost the DC bus voltage includes boosting the DC bus voltage to a level substantially ((100/(100−X))−1)*100 percent greater than the peak three phase AC input voltage.

In some cases the rectifier is a multi-level PWM rectifier that has multiple possible switching states and wherein the step of controlling the rectifier includes controlling the rectifier switching states so that at least one of a ppp state in which each of the three supply lines is linked to the positive DC bus and an nnn state wherein each of the three supply lines is linked to the negative DC bus is excluded. Here, the inverter may include a multi-level PWM inverter that has at least twenty-seven possible switching states and the step of controlling the inverter may include controlling the inverter so that at least a subset of the twenty-seven states are excluded. Moreover, here the possible inverter switching states may include a ppp state in which each of the three motor phases is linked to the positive DC bus and an nnn state wherein each of the three motor phases is linked to the negative DC bus and the step of controlling the inverter may include controlling the inverter so that at least one of the ppp and nnn switching states is excluded.

In some cases the inverter switching states also include a sub-set of medium voltage vectorswitching states wherein, for each of the medium voltage vector switching states, the three load phases are linked to different ones of the positive DC bus, the negative DC bus and a neutral point bus, the step of controlling the inverter including controlling the inverter so that only the medium voltage vector switching states occur. Here, the step of controlling the rectifier may include controlling the rectifier switching states so that each of the ppp and the nnn states are excluded.

In some cases the inverter includes a three level PWM inverter and the rectifier includes a two level rectifier and wherein the step of controlling the rectifier includes controlling the rectifier switching states so that each of the ppp and nnn states are excluded.

In some embodiments the inverter includes a three level PWM inverter that has twenty-seven possible switching states and wherein the step of controlling the inverter includes controlling the inverter so that at least a subset of the twenty-seven states are excluded. Here, the switching states may include a sub-set of medium voltage vector switching states wherein, for each of the medium voltage vector switching states, the three load phases are linked to different ones of the positive DC bus, the negative DC bus and a neutral point bus, the step of controlling the inverter including controlling the inverter so that only the medium voltage vector switching states occur.

In some cases the rectifier includes a two level PWM rectifier and wherein the step of controlling the rectifier includes controlling the rectifier switching states so that each of a ppp state in which each of the three supply lines is linked to the positive DC bus and an nnn state wherein each of the three supply lines is linked to the negative DC bus is excluded.

In some cases the rectifier includes at least one boost converter and the step of controlling the rectifier includes controlling the boost converter.

In some cases the rectifier includes a three level PWM rectifier and the step of controlling the rectifier includes controlling the rectifier switching states so that at least one of a ppp state in which each of the three supply lines is linked to the positive DC bus and an nnn state wherein each of the three supply lines is linked to the negative DC bus is excluded. Here the step of controlling the rectifier may include controlling the rectifier so that each of the ppp and the nnn states is excluded.

Another embodiment of the invention includes a method for converting three phase AC input voltages on three supply lines to three phase AC output voltages supplied to a load where there is a rated output voltage, the method for reducing common mode voltage applied to the load and comprising the steps of linking a rectifier between the AC supply lines and positive and negative DC buses, linking an inverter between the DC buses and the load, controlling the inverter to convert a DC bus voltage to the AC output voltages provided to the load such that the provided voltages are substantially free of common mode voltage, the inverter controlling step reducing the maximum inverter output voltage to a percentage of the three-phase AC input voltage and controlling the rectifier to convert the AC input voltage to DC voltage across the DC buses, the rectifier controlling step including boosting the DC bus voltage to a level such that the maximum inverter output voltage is substantially equal to the three-phase AC input voltage. In some cases, during normal operation, the inverter is capable of generating maximum inverter output voltages given a specific DC bus voltage and the step of controlling the inverter such that the output voltages are substantially free of common mode voltage includes controlling the inverter such that the maximum inverter output voltage is X % less than the maximum inverter output voltage during normal inverter operation and given a specific DC bus voltage, the step of controlling the rectifier to boost the DC bus voltage includes boosting the DC bus voltage to a level substantially $((100/(100-X))-1)$*100 percent greater than the peak three phase AC input voltage where X is expressed as a percentage.

In some embodiments the step of linking an inverter includes linking a three-level PWM inverter that has twenty-seven possible switching states including a sub-set of medium voltage vector switching states wherein, for each of the medium voltage vector switching states, the three load phases are linked to different ones of the positive DC bus, the negative DC bus and a neutral point bus, the step of controlling the inverter including controlling the inverter so that only the medium voltage vector switching states occur.

In some cases the rectifier is a multi-level PWM rectifier that has multiple possible switching states and the step of controlling the rectifier includes controlling the rectifier switching states so that at least one of a ppp state in which each of the three supply lines is linked to the positive DC bus and an nnn state wherein each of the three supply lines is linked to the negative DC bus is excluded. In some cases the step of controlling the rectifier includes controlling the rectifier switching states so that both of the ppp and the nnn states are excluded.

In some cases the step of linking the rectifier includes linking a two-level rectifier. In other cases the step of linking the rectifier includes linking a three-level rectifier. In still other cases the step of linking the rectifier includes linking at least one boost converter. Here, the boost converter may include a diode bridge, an inductor, a capacitor and a controllable switch.

Another inventive embodiment includes a method for converting three phase AC input voltages on three supply lines to three phase AC output voltages supplied to a load where there is a rated output voltage, the method for reducing common mode voltage applied to the load and comprising the steps of linking a rectifier between an AC source and positive and negative DC buses, linking a three phase, three-level PWM inverter between the DC buses and the load, the inverter having a plurality of switching states including a sub-set of medium voltage vector switching states wherein, for each of the medium voltage vector switching states, the three load phases are linked to different ones of the positive DC bus, the negative DC bus and a neutral point bus, during normal operation, the inverter capable of generating maximum inverter output voltages given a specific DC bus voltage, controlling the rectifier to convert the supply voltage to DC voltage across the DC buses and so that the DC bus voltage is boosted to a level more than X % greater than the peak three phase AC input voltage and controlling the inverter so that only the medium voltage vector switching states occur to convert a DC bus voltage to the AC output voltages provided to the load whereby the maximum inverter output voltage is reduced such that the maximum inverter output voltage is X % less than the maximum inverter output voltage during normal inverter operation and given a specific DC bus voltage.

Still one other embodiment includes a method for converting three phase AC input voltages on three supply lines to three phase AC output voltages supplied to a load where there is a rated drive output voltage, the method for reducing common mode voltage applied to the load and comprising the steps of linking a passive rectifier between an AC source and positive and negative DC buses, linking a three phase, three-level PWM inverter between the DC buses and the load, the inverter having a plurality of switching states including a ppp state in which each of the three motor phases is linked to the positive DC bus and an nnn state wherein each of the three motor phases is linked to the negative DC bus and controlling the inverter to provide AC voltages to the load such that the maximum inverter output voltage is substantially equal to the three-phase AC input voltage and so that the ppp and nnn switching states are excluded.

In addition to the methods, the invention contemplates apparatus for performing the inventive methods.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE SEVERAL VIEWS OF THE DRAWINGS

The invention will hereafter be described with reference to the accompanying drawings, wherein like reference numerals denote like elements, and:

FIG. 2A is a schematic diagram illustrating switching states of a two-level rectifier or inverter while

DETAILED DESCRIPTION OF THE INVENTION

One or more specific embodiments of the present invention will be described below. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 3:
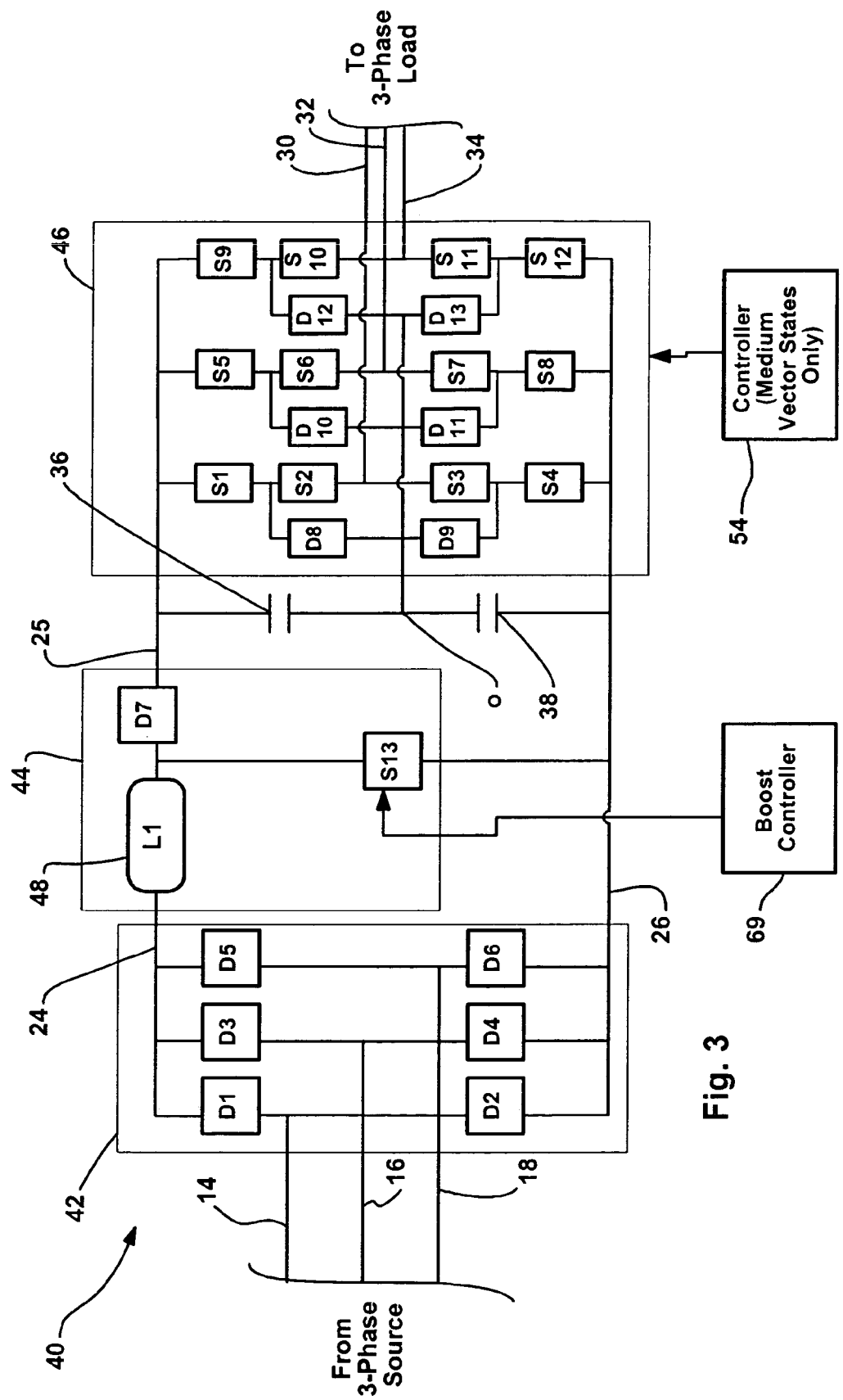
FIG. 3 is a schematic diagram illustrating a drive consistent with at least some aspects of the present invention that includes a diode bridge rectifier, a boost circuit and a three-level inverter where the inverter is controlled using medium vector switching states only.

Referring now to the drawings wherein like reference numerals correspond to similar elements throughout the several views and, more specifically, referring to FIG. 3, one exemplary drive configuration 40 that is consistent with at least some aspects of the present invention is illustrated. Drive configuration 40 receives three-phase AC supply voltages via supply lines 14, 16 and 18 and converts those voltages to three-phase AC voltages that are provided to a load via load lines 30, 32 and 34. To this end, drive 40 includes a diode bridge rectifier 42, a boost converter 44, a three-level, three-phase, neutral point clamped inverter 46, a boost controller 69 and an inverter controller 54.

Diode bridge rectifier 42 includes six diodes D1, D2, D3, D4, D5 and D6 that are arranged to form three rectifier legs including a first leg comprising diodes D1 and D2 linked between positive and negative DC buses 24 and 26, respectively, a second leg including diodes D3 and D4 linked in series between the DC buses and the third leg including diodes D5 and D6 linked in series between the DC buses. Supply line 14 is linked to a common node between diodes D1 and D2. Similarly, lines 16 and 18 are linked to common nodes between diodes D3 and D4 and between diodes D5 and D6, respectively. As known in the power conversion arts, bridge rectifier 42 operates in a passive mode to convert three-phase AC voltages presented on lines 14, 16 and 18 to a DC potential across positive and negative DC buses 24 and 26, respectively. As illustrated in FIG. 3, a second portion of positive bus 24 is referred to by numeral 25. Two capacitors 36 and 38 are provided between the positive and negative DC buses 25 and 26 where each of the capacitors 36 and 38 has substantially equal capacitance values. Thus, as voltage is applied across buses 25 and 26, capacitors 36 and 38 charge and help to maintain a potential. A central point "o" between capacitors 36 and 38 is referred to hereinafter as neutral clamp point.

Referring still to FIG. 3, three-level inverter 46 includes first through twelfth switching devices labeled S1 through S12, respectively and $8^{th}$ through $13^{th}$ diodes labeled D8 through D13, respectively. Switching devices S1 through S12 are arranged to form three inverter legs. The first inverter leg includes switches S1, S2, S3 and S4 arranged in series between positive and negative DC buses 25 and 26, respectively. Similarly, the second inverter leg includes switches S5, S6, S7 and S8 arranged in series between buses 25 and 26 and the third inverter leg includes switches S9, S10, S11 and S12 arranged in series between buses 25 and 26. Diodes D8 and D9 are connected between neutral clamp point o and nodes between adjacent switches S1 and S2, and between switches S3 and S4 in the first inverter leg respectively. Similarly, diodes D10 and D1, and diodes D12 and D13 are connected between clamp point o and nodes between adjacent switches S5 and S6 and switches S7 and S8 in the second inverter leg, and between adjacent switches S9 and S10 and switches S11 and S12 in the third inverter leg. The common point or node between switches S2 and S3 in the first inverter leg is linked to first load line 30. Similarly, the common node between switches S6 and S7 in the second inverter leg is linked to load line 32 and the common node between switches S10 and S11 in the third inverter leg is linked to load line 34.

As is well known in the power conversion arts, controller 54 provides control signals to each of switches S1 through S12 to either turn the switches on or off. Thus, controller 54 can be controlled to link any one of the load lines 30, 32 or 34 to any one of the positive DC bus 25, the negative DC bus 26 or the neutral clamp point o. For example, load line 30 can be linked to positive DC bus 25 by turning on switches S1 and S2, can be linked to the negative DC bus 26 by turning on switches S3 and S4 or can be linked to neutral clamp point o by turning on switches S2 and S3.

Referring once again to FIG. 3, boost circuit 44, as the label implies, is controllable to increase or boost the DC bus potential across the positive and negative DC buses 24 and 26. Thus, when controlled in a suitable fashion, the DC bus potential between positive bus section 25 and negative bus 26 can be increased to a level greater than the DC bus potential between positive bus section 24 and negative bus 26. In this regard, boost circuit 44 includes an inductor 48 (L1), a seventh diode D7 and a thirteenth controllable switch S13. Here, switch S13 is typically operated at a high rate with each closing operation serving to store energy in inductor 48 and each opening operation effecting a transfer of the stored energy through diode D7 to capacitors 36 and 38. Here, the portion of time within each switching cycle that switch S13 is closed is varied in direct relation to the desired change in the output voltage or potential across buses 25 and 26. That is, to increase the potential across buses 25 and 26, the duty cycle of switch S13 is increased to increase the output voltage.

Boost controller 69 and inverter controller 56 are simply processors programmed to control switch S13 and inverter switches S1–S12, respectively, using protocols that are consistent with the present invention.

Referring once again to FIG. 2B and still to FIG. 3, as described above, for three-level neutral point clamped inverter 46, there are 27 separate switching states where each of the different switching states is represented by a combination of three lower case letters including "o", "p" and "n". For example, exemplary switching states in FIG. 2B include switching states "npn", "opn", "ppp", etc. The three letters in each switching state label correspond to the three inverter legs described above, respectively. For instance in the case of the switching state labeled "npn", the first "n" corresponds to the inverter leg including switches S1 through S4 in FIG. 3, the "p" corresponds to the second inverter leg including switches S5 through S8 and the second "n" corresponds to the third inverter leg including switches S9 through S12. An "n" indicates that a load line linked to a corresponding inverter leg is linked to the negative DC bus 26. Similarly, a "p" indicates that the load line linked to a corresponding leg is linked to the positive DC bus 25. A "o" indicates that a load line linked to a corresponding leg is linked to neutral clamp point o. Thus, for instance, in the case of the switching state labeled "npn", the first, second and third inverter legs in FIG. 3 link load lines 30, 32 and 34 to the negative DC bus 26, the positive DC bus 25 and the negative DC bus 26, respectively. As another example, for the switching state labeled "ppp", the first, second and third inverter legs link each of load lines 30, 32 and 34 to the positive DC bus 25.

Figure 2A:
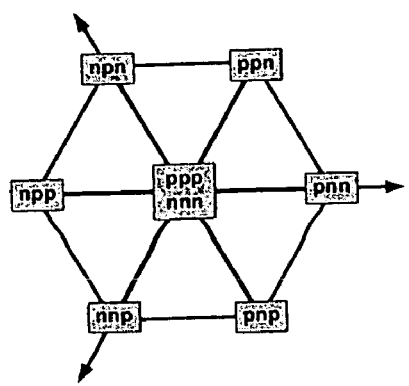
Figure 2B:
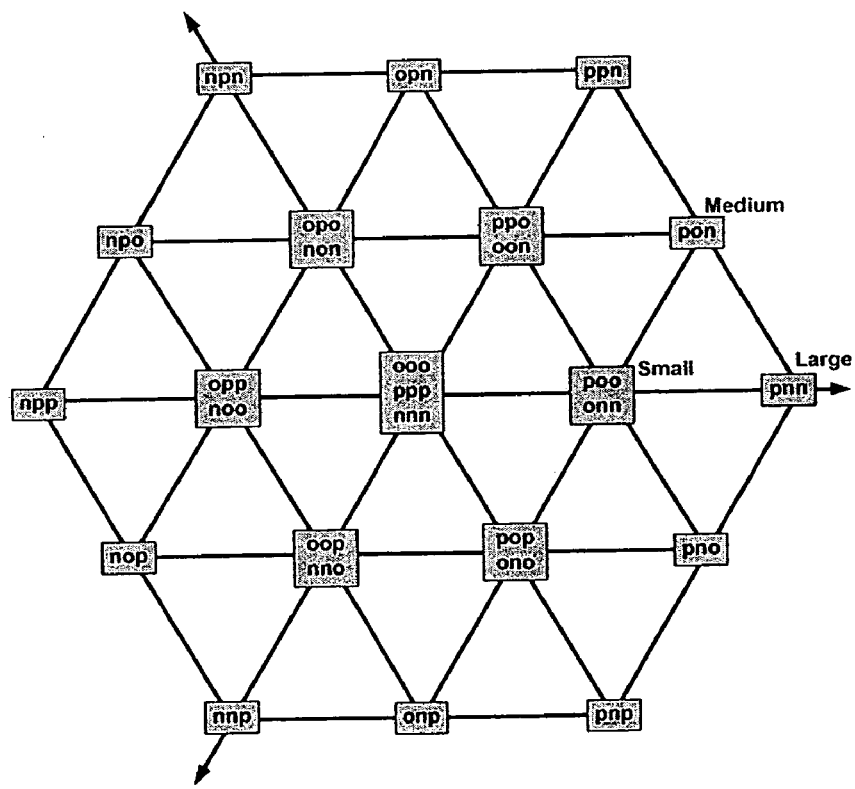
FIG. 2B is a schematic diagram illustrating the switching states of a three-level rectifier or inverter.

Referring still to FIGS. 2B and 3, the 27 possible switching states corresponding to a neutral point clamped three-level inverter include six medium vector switching states including states opn, pon, pno, onp, nop, and npo. It has been recognized that when a three level inverter is controlled so that only the medium vector switching states occur, the inverter 46 does not generate CMV. Thus, according to at least some embodiments of the present invention, controller 54 is used to control three-level inverter 46 so that only medium vector switching states are used to generate the AC voltages on load lines 30, 32 and 34.

It has also been recognized that, when only medium vector switching states are used to control inverter 46, the maximum output voltage of the inverter 46 is reduced to approximately 87% of the three-phase AC input voltage. Thus, according to another aspect of the present invention, when only medium vector switching states are used to control inverter 46, boost circuit 44 is used to increase the DC bus voltage across buses 25 and 26 by an amount calculated to compensate for the maximum inverter output voltage drop. In this regard, in at least some cases, boost circuit 44 is used to increase the DC bus voltage across buses 25 and 26 by more than the percent reduction caused by the limited switching protocol. More specifically, the following equation can be used to determine how much boost circuit 44 should increase the DC bus voltage:

$$([100/(100-X)]-1)*100 \quad (2)$$

where X is the voltage reduction percentage associated with inverter 46 when controlled using the limited switching protocol. In the present example where X is 13%, the percent boost is approximately 15% according to Equation 2.

After the required boost value is determined and during normal operation of drive 40, switch S13 is controlled to boost the DC bus potential to the target level and generally to a level greater than the nominal DC bus voltage using a diode bridge rectifier (i.e., to a level greater than the peak three phase AC input voltage). Thereafter, when inverter 46 is controlled so that only medium vector switching states occur to reduce CMV which in turn reduces the inverter output voltage, the boosted DC potential compensates for the reduction caused by the limited inverter switching protocol and the end result is a maximum inverter output voltage which is substantially equal to the rated output voltage for the drive where the output voltage includes substantially reduced CMV.

In the present example illustrated in FIG. 3, it has been determined that the total peak-peak CMV that results is approximately 30% of the nominal DC bus voltage generated using a diode bridge rectifier. Here, switch S13 and the switches in the three-level inverter can switch at different PWM frequencies. One problem with this embodiment is that voltage spikes may occur in the CMV due to simultaneous transitioning of two phases in the three-level inverter 46.

Figure 1:
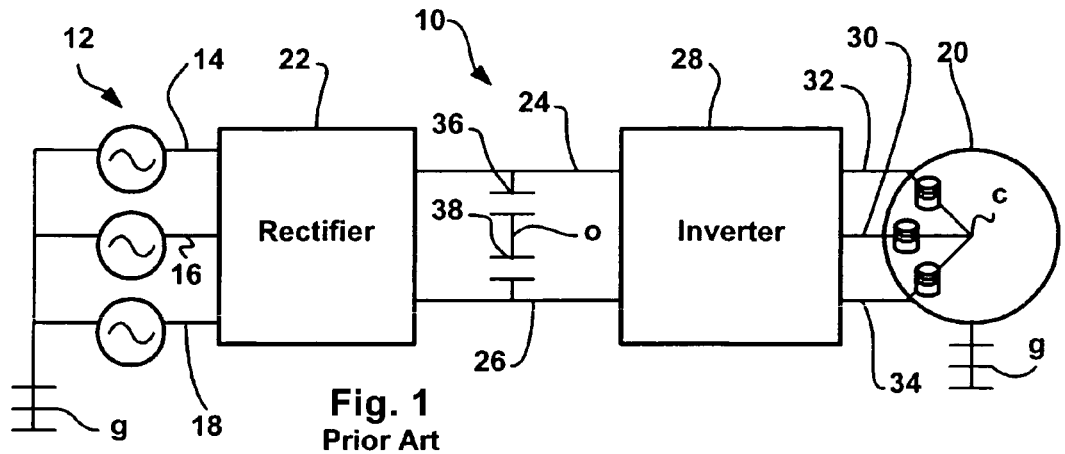
FIG. 1 is a schematic diagram of an exemplary prior art three-phase drive system.
Figure 4:
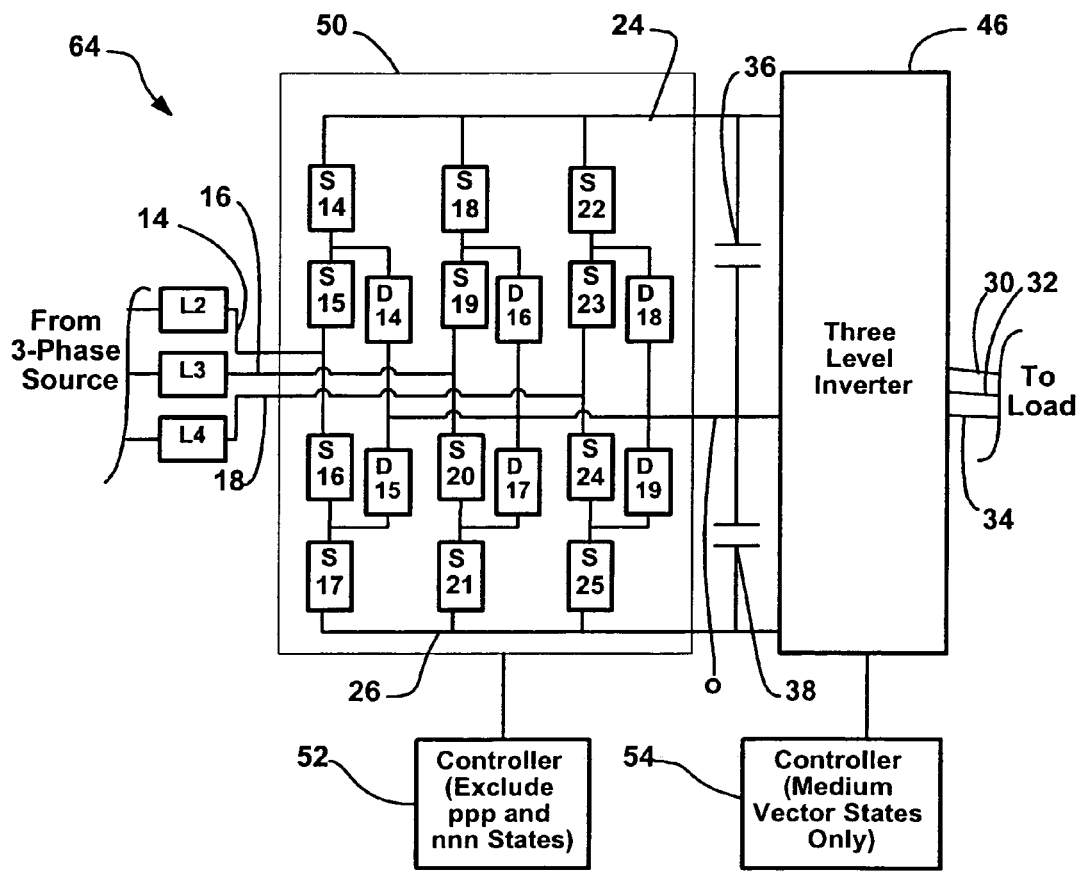
FIG. 4 is a schematic diagram of a drive consistent with at least some aspects of present invention including a three-level rectifier and a three-level inverter where the three-level inverter is controlled using only medium vector switching states and the three-level rectifier is controlled using a different limited switching protocol.

Referring now to FIG. 4, a second drive configuration 64 consistent with at least some aspects of the present invention is illustrated. In FIG. 4, as in the drive configuration 40 of FIG. 3, drive 64 includes a three-level inverter 46. The components of inverter 46 are identical to the components described above with respect to FIG. 3, and therefore, in the interest of simplifying this explanation, will not be described again here in detail. In addition controller 54 and the limited switching protocol described above with respect to the three-level inverter in FIG. 3 is used with drive 64 wherein only medium vector switching states are employed. Thus, controller 54 and the limited protocol is not again described here in detail.

In FIG. 4, instead of including a diode bridge rectifier and a boost circuit as in FIG. 3, drive 64 includes a three-phase, neutral point clamped three-level rectifier 50. Three-level rectifier 50 includes $14^{th}$ through $25^{th}$ switches S14 through S25, respectively, $14^{th}$ through $19^{th}$ diodes D14 through D19, respectively, and inductors L2, L3, and L4. Switches S14 through S25 are arranged to form three rectifier legs including switches S14, S15, S16 and S17 arranged in series between DC buses 24 and 26 to form a first leg, switches S18, S19, S20 and S21 arranged in series between DC buses 24 and 26 to form a second leg and switches S22, S23, S24 and S25 arranged in series between DC buses 24 and 26 to form a third leg. Supply line 14 is linked to a common node between switches S15 and S16 in the first rectifier leg. Similarly, supply lines 16 and 18 are linked to common nodes between switches S19 and S20 and between switches S23 and S24 in the second and third rectifier legs, respectively. Diodes D14 through D19 are connected between neutral clamp point o and nodes between each of switches S14 and S15 and switches S16 and S17 in the first inverter leg, to nodes between each of switches S18 and S19 and switches S20 and S21 in the second inverter leg and to nodes between switches S22 and S23 and switches S24 and S25 in the third inverter leg respectively.

A rectifier controller 52 is provided for controlling switches S14 through S25. As in the case of three-level inverter 46, three-level rectifier 50 is controllable to assume each of the twenty-seven different switching states illustrated in FIG. 2B. Here, however, the switching states indicate linkage of supply lines 14, 16 and 18 to the positive and negative DC buses and the neutral clamp point o instead of indicating linkage of the load lines 30, 32 and 34 to the same. For instance, an "n" indicates linkage of a supply line to negative DC bus 26, a "p" indicates linkage of a supply line to positive DC bus 24 and a "o" indicates linkage of a supply line to neutral clamp point o.

In the embodiment illustrated in FIG. 4, controller 54 controls inverter 46 so that only medium vector switching states opn, pon, pno, onp, nop, and npo occur thereby eliminating the CMV caused by inverter 46. As indicated above, when only medium switching states are used to control inverter 46, there is a 13% reduction between the three-phase AC input voltage and the maximum inverter output voltage. Here, to maintain the maximum inverter output voltage at the three-phase AC input level, controller 52 is used to control rectifier 50 switches to, in effect, boost the DC bus voltage across buses 24 and 26 to a level greater than the nominal DC bus voltage level generated using a diode bridge rectifier. More specifically, Equation 2 above is again used to determine how much rectifier 50 should increase the DC bus potential above the nominal DC bus voltage generated using a diode bridge rectifier. In the present case, Equation 2 yields an approximately 15% increase.

In the FIG. 4 embodiment, controller 52 controls rectifier 50 using a switching protocol that excludes both the ppp and nnn switching states to further reduce total peak-peak CMV while still boosting the DC bus voltage by 15%. When rectifier 50 and inverter 46 are controlled as described above, the maximum drive output voltage is equal to the three-phase AC input voltage and the total peak-peak CMV is 0.67 $v_{dc}$ with a step height of 0.16 $v_{dc}$, where $v_{dc}$ is the boosted DC bus voltage.

Figure 5:
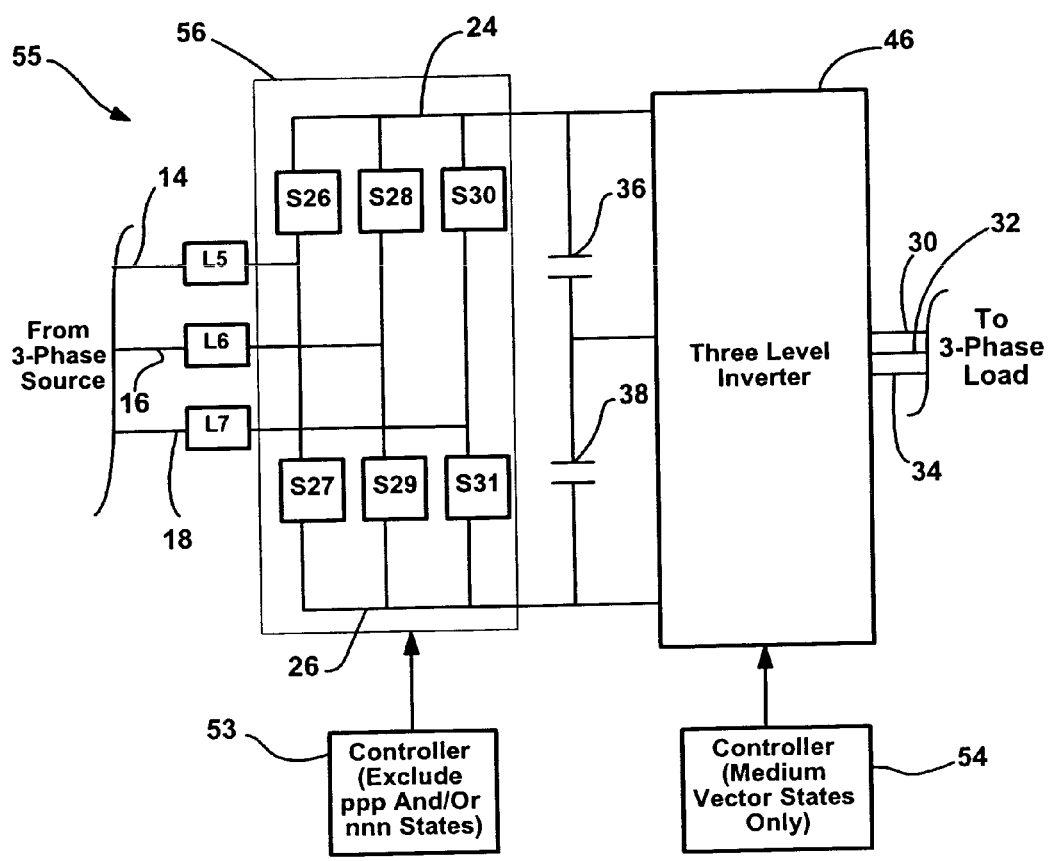
FIG. 5 is a schematic diagram of a drive consistent with at least some aspects of present invention including a three-level inverter and a two-level rectifier where the inverter is controlled using only medium vector switching states and the rectifier is controlled using a different limited switching protocol.

Referring now to FIG. 5, one additional drive configuration 55 is illustrated which, like the embodiments of FIGS. 3 and 4, includes a three-level inverter 46 and an inverter controller 54. In addition, drive 55 includes a two-level rectifier 56 and a rectifier controller 53. Two-level rectifier 56 includes switches S26 through S31 that form three rectifier legs and inductors L5 through L7. Switches S26 and S27 are linked in series between DC buses 24 and 26 to form the first leg, switches S28 and S29 are linked between the buses to form the second leg and switches S30 and S31 are linked between the buses to form the third leg. Here, lines 14, 16 and 18 are linked to nodes between switches S26 and S27, switches S28 and S29 and switches S30 and S31, in the first through third rectifier legs, respectively. Controller 53 controls switches S26 through S31 to convert the AC supply voltages on lines 14, 16 and 18 to a DC bus voltage across buses 24 and 26. Here, because there are only six switches in two-level rectifier 56, there are only eight possible switching states (see again FIG. 2A) including ppp, nnn, ppn, pnn, pnp, nnp, npp and npn.

According to at least one embodiment of the invention, controller 54 controls three-level inverter 46 using medium vector switching states only thereby reducing the CMV from the inverter 46 to a zero level while reducing the maximum inverter output voltage to a level 13% below the three-phase AC input voltage. To compensate for the 13% inverter output voltage drop, controller 53 controls switches S26–S31 to boost the DC bus voltage. Once again, the amount by which the DC voltage should be boosted to compensate for the inverter voltage drop can be determined using equation 2 above which, with the 13% voltage drop, yields a voltage boost value of approximately 15%.

Referring still to FIG. 5, in addition to controlling inverter 46 with a limited switching protocol, it has been recognized that CMV can be further reduced by controlling rectifier 56 with a limited switching protocol. In this regard, in at least some embodiments, controller 53 may exclude either the ppp or the nnn switching states when controlling rectifier 56. In this case, the total peak-peak CMV is 0.67 $v_{dc}$ and the step height is 0.33 $v_{dc}$, where $v_{dc}$ is the boosted DC bus voltage. In another embodiment, controller 53 may control rectifier 56 while excluding both the ppp and nnn states. Here, the total peak-peak CMV is reduced to 0.33 $v_{dc}$ and the step height remains 0.33 $v_{dc}$. In either of the above two cases, the DC bus capacitors 36 and 38 cannot be actively balanced by the controller 54.

Figure 6:
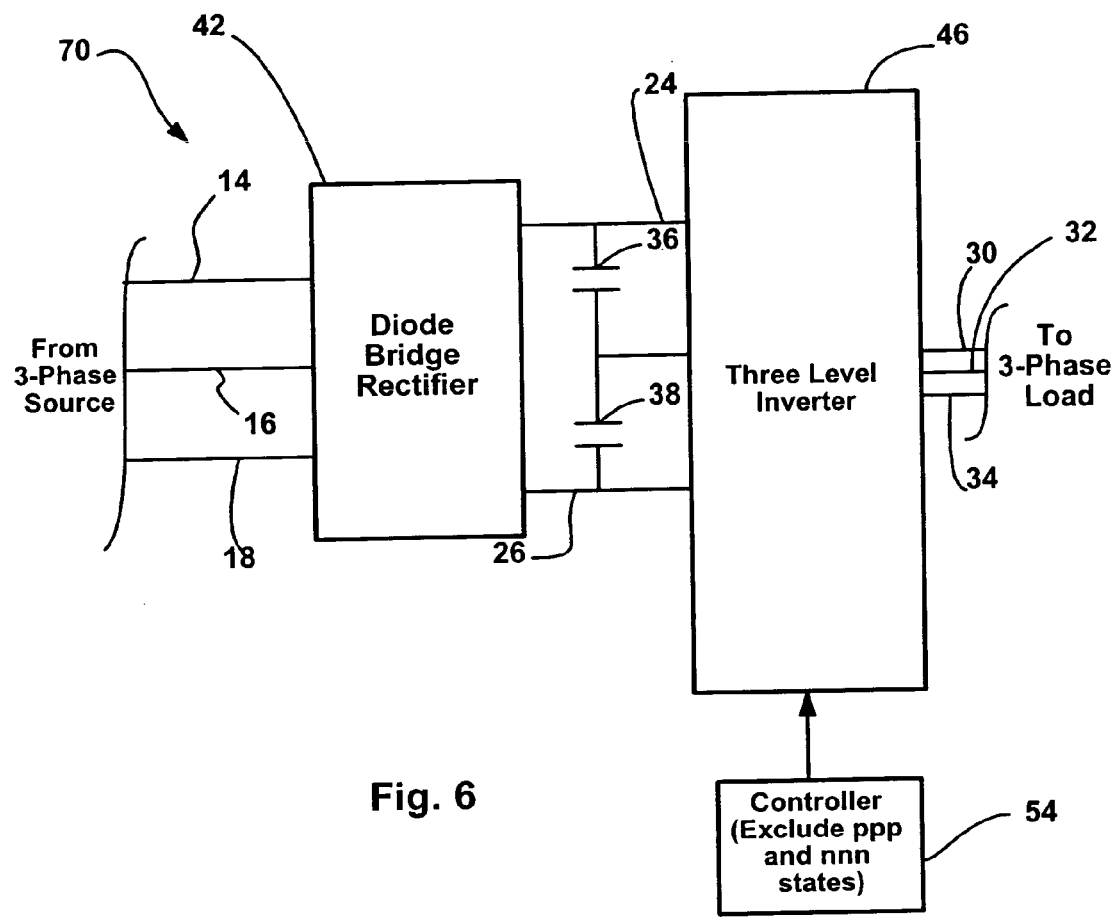
FIG. 6 is a schematic diagram of yet another drive consistent with at least some aspects of present invention including a three-level inverter and a diode bridge rectifier wherein the inverter is controlled using a switching protocol that excludes both ppp and nnn switching states.

Referring now to FIG. 6, one additional drive configuration 70 that is consistent with at least some aspects of the present invention is illustrated. Drive 70, as in the case of all of the drives described above with respect to FIGS. 3, 4 and 5, includes a three-level neutral-point clamped inverter 46 and an inverter controller 54. In addition, drive 70 includes a diode bridge rectifier 42 like the rectifier described above with respect to FIG. 3. Rectifier 42 generates a DC potential across buses 24 and 26. In the embodiment of FIG. 6, instead of using only medium vector switching states to control inverter 46, controller 54 uses all of the switching states identified in FIG. 2 except for the ppp and nnn switching states. Here, because large vector switching states are used by controller 54, the maximum inverter output voltage is equal to the three-phase AC input voltage and therefore there is no need for the DC bus voltage value to be boosted. Nevertheless, because the ppp and nnn states are excluded by controller 54, the peak-peak CMV is reduced. More specifically, in the case of the drive 70 when controlled to exclude ppp and nnn states, the peak-peak CMV is 0.97 $v_{dc}$ and the step height is reduced to 0.16 $v_{dc}$. In this case, because small vector states are included in the inverter switching protocol, voltages on capacitors 36 and 38 can be actively balanced.

Figure 7:
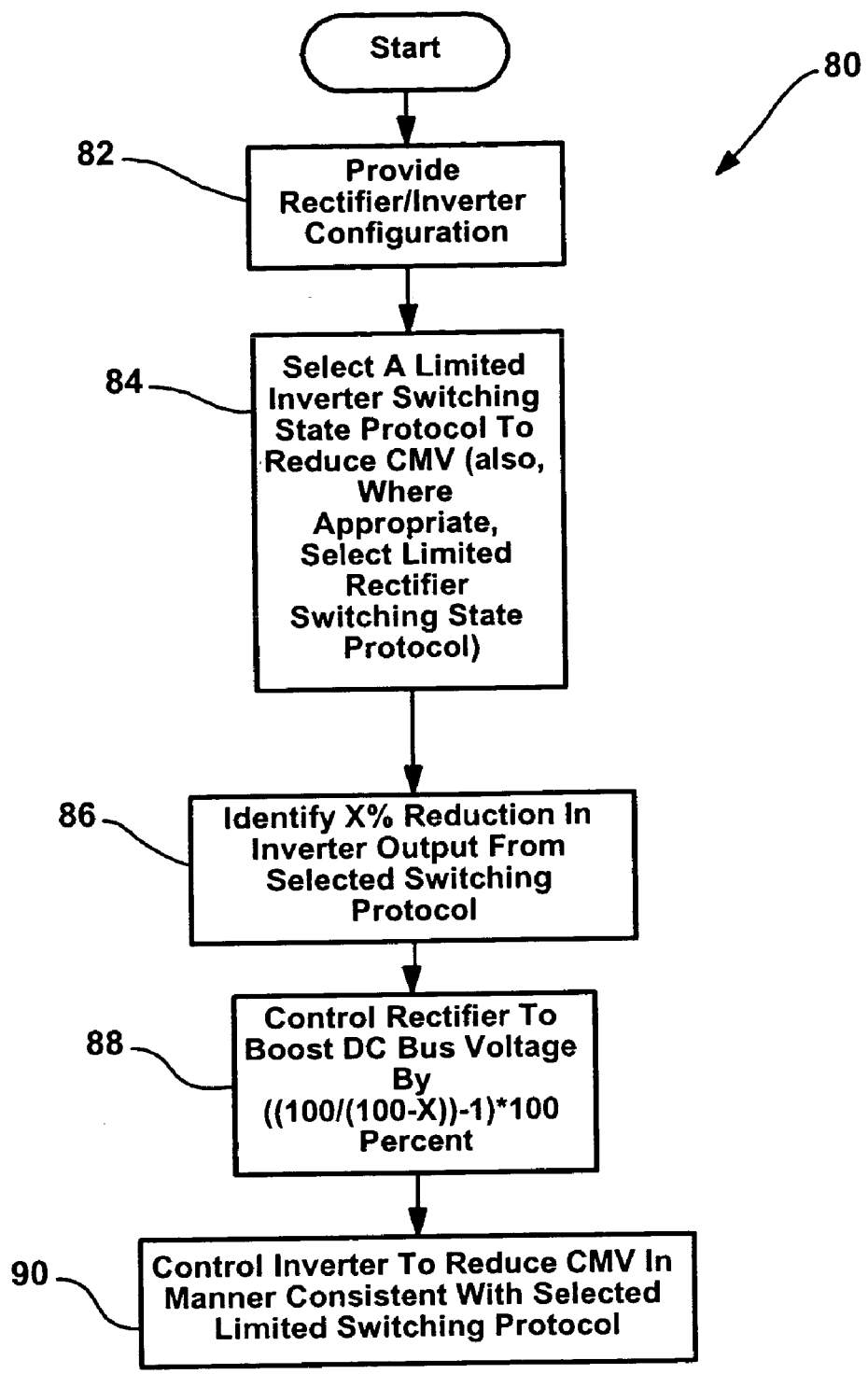
FIG. 7 is a flow chart illustrating a method that is consistent with at least some aspects of the present invention.

Referring now to FIG. 7, a method 80 consistent with at least some aspects of the present invention is illustrated. At block 82, a rectifier/inverter configuration is provided, configured and linked in any of the manners described above. Thus, the rectifier may include a diode bridge plus a boost circuit, a two-level switching type rectifier, a three-level switching type rectifier, etc., and the inverter may include either a two or three-level switching type inverter. At block 84, a limited inverter switching state protocol is selected for reducing the CMV. In addition, at block 84, where the rectifier is a switching type rectifier, a limited rectifier switching protocol is selected to further reduce CMV. At block 86, the percent reduction in inverter output that results from the selected switching protocol is identified. At block 88, during normal operation of the drive, the rectifier is controlled to boost the DC bus voltage by a percentage calculated to compensate for the inverter drop caused by the limited switching protocol. Here, where the rectifier is a switching type, the limited rectifier switching protocol selected at block 84 is used to drive the rectifier. Where the rectifier is a diode bridge including a boost circuit, the boost circuit is controlled to boost the DC bus voltage. Finally, at block 90 the inverter is controlled to reduce the CMV in a manner consistent with the selected limited inverter switching protocol.

While the invention may be susceptible to various modifications and alternative forms, specific embodiments have been shown by way of example in the drawings and have been described in detail herein. However, it should be understood that the invention is not intended to be limited to the particular forms disclosed. For example, while particularly advantageous results occur when inverter switching states are limited to medium vector states, other limited inverter switching protocols are contemplated including protocols including all but ppp and nnn states, protocols including all but ppp or nnn states, protocols including medium vector states and a subset of a small vector states, and so on. In addition, embodiments are contemplated where both switching type rectifier and boost circuits are employed.

Moreover, in the embodiment above including both a three-level inverter and a three-level rectifier, the rectifier may be controlled using a limited switching protocol that includes all but one of ppp and nnn switching states with at least some advantageous results. Furthermore, four or more level inverters and rectifiers are contemplated in various configurations where the multi-level inverters are controlled using incomplete switching protocols to reduce CMV while still maintaining high maximum drive output.

Thus, the invention is to cover all modifications, equivalents, and alternatives falling within the spirit and scope of the invention as defined by the following appended claims.

To apprise the public of the scope of this invention, the following claims are made:

What is claimed is:

1. A method for reducing common mode voltage applied to a load by a drive, the drive including a rectifier linked between three AC supply lines and positive and negative DC buses that converts AC supply voltage to DC voltage across the DC buses and an inverter linked between the DC buses and a load, the rectifier providing a DC input voltage to the inverter wherein, during normal operation, the inverter is capable of generating maximum inverter output voltages given a specific DC bus voltage, the method comprising the steps of:
   controlling the inverter to supply output voltages to the load where the output voltages are substantially free of common mode voltage and such that the maximum inverter output voltage is lower than the maximum inverter output voltage during normal inverter operation and given a specific DC bus voltage; and
   controlling the rectifier to convert the supply voltage to DC voltage across the DC buses and so that the DC bus voltage is boosted to a level greater than the peak three phase AC input voltage.

2. The method of claim 1 wherein the rectifier is a multi-level PWM rectifier that has multiple possible switching states and wherein the step of controlling the rectifier includes controlling the rectifier switching states so that at least one of a ppp state in which each of the three supply lines is linked to the positive DC bus and an nnn state wherein each of the three supply lines is linked to the negative DC bus is excluded.

3. The method of claim 2 wherein the inverter includes a multi-level PWM inverter that has at least twenty-seven possible switching states and wherein the step of controlling the inverter includes controlling the inverter so that at least a subset of the twenty-seven states are excluded.

4. The method of claim 3 wherein the possible inverter switching states include a ppp state in which each of the three motor phases is linked to the positive DC bus and an nnn state wherein each of the three motor phases is linked to the negative DC bus and wherein the step of controlling the inverter includes controlling the inverter so that at least one of the ppp and nnn switching states are excluded.

5. The method of claim 4 wherein the inverter switching states also include a sub-set of medium voltage vector switching states wherein, for each of the medium voltage vector switching states, the three load phases are linked to different ones of the positive DC bus, the negative DC bus and a neutral point bus, the step of controlling the inverter including controlling the inverter so that only the medium voltage vector switching states occur.

6. The method of claim 5 wherein the step of controlling the rectifier includes controlling the rectifier switching states so that each of the ppp and the nnn states are excluded.

7. The method of claim 5 wherein the inverter includes a three level PWM inverter and the rectifier includes a two level rectifier and wherein the step of controlling the rectifier includes controlling the rectifier switching states so that each of the ppp and nnn states are excluded.

8. The method of claim 1 wherein the inverter includes a three level PWM inverter that has twenty-seven possible switching states and wherein the step of controlling the inverter includes controlling the inverter so that at least a subset of the twenty-seven states are excluded.

9. The method of claim 8 wherein the switching states include a sub-set of medium voltage vector switching states wherein, for each of the medium voltage vector switching states, the three load phases are linked to different ones of the positive DC bus, the negative DC bus and a neutral point bus, the step of controlling the inverter including controlling the inverter so that only the medium voltage vector switching states occur.

10. The method of claim 9 wherein the rectifier includes a two level PWM rectifier and wherein the step of controlling the rectifier includes controlling the rectifier switching states so that each of a ppp state in which each of the three supply lines is linked to the positive DC bus and an nnn state wherein each of the three supply lines is linked to the negative DC bus is excluded.

11. The method of claim 9 wherein the rectifier includes at least one boost converter and wherein the step of controlling the rectifier includes controlling the boost converter.

12. The method of claim 8 wherein the rectifier includes a three level PWM rectifier and wherein the step of controlling the rectifier includes controlling the rectifier switching states so that at least one of a ppp state in which each of the three supply lines is linked to the positive DC bus and an nnn state wherein each of the three supply lines is linked to the negative DC bus is excluded.

13. The method of claim 12 wherein the step of controlling the rectifier includes controlling the rectifier so that each of the ppp and the nnn states is excluded.

14. A method for converting three phase AC input voltages on three supply lines to three phase AC output voltages supplied to a load where there is a rated output voltage, the method for reducing common mode voltage applied to the load and comprising the steps of:

linking a rectifier between the AC supply lines and positive and negative DC buses;

linking an inverter between the DC buses and the load;

controlling the inverter to convert a DC bus voltage to the AC output voltages provided to the load such that the provided voltages are substantially free of common mode voltage, the inverter controlling step reducing the maximum inverter output voltage to a percentage of the three-phase AC input voltage; and controlling the rectifier to convert the AC input voltage to DC voltage across the DC buses, the rectifier controlling step including boosting the DC bus voltage to a level such that the maximum inverter output voltage is substantially equal to the three-phase AC input voltage.

15. The method of claim 14 wherein the step of linking an inverter includes linking a three-level PWM inverter that has twenty-seven possible switching states including a sub-set of medium voltage vector switching states wherein, for each of the medium voltage vector switching states, the three load phases are linked to different ones of the positive DC bus, the negative DC bus and a neutral point bus, the step of controlling the inverter including controlling the inverter so that only the medium voltage vector switching states occur.

16. The method of claim 14 wherein the rectifier is a multi-level PWM rectifier that has multiple possible switching states and wherein the step of controlling the rectifier includes controlling the rectifier switching states so that at least one of a ppp state in which each of the three supply lines is linked to the positive DC bus and an nnn state wherein each of the three supply lines is linked to the negative DC bus is excluded.

17. The method of claim 16 wherein the step of controlling the rectifier includes controlling the rectifier switching states so that each of the ppp and the nnn states are excluded.

18. The method of claim 16 wherein the step of linking the rectifier includes linking a two-level rectifier.

19. The method of claim 16 wherein the step of linking the rectifier includes linking a three-level rectifier.

20. The method of claim 14 wherein the step of linking the rectifier includes linking at least one boost converter.

21. The method of claim 20 wherein the boost converter includes a diode bridge, an inductor, a capacitor and a controllable switch.

22. A method for converting three phase AC input voltages on three supply lines to three phase AC output voltages supplied to a load where there is a rated output voltage, the method for reducing common mode voltage applied to the load and comprising the steps of:

linking a rectifier between an AC source and positive and negative DC buses;

linking a three phase, three-level PWM inverter between the DC buses and the load, the inverter having a plurality of switching states including a sub-set of medium voltage vector switching states wherein, for each of the medium voltage vector switching states, the three load phases are linked to different ones of the positive DC bus, the negative DC bus and a neutral point bus, during normal operation, the inverter capable of generating maximum inverter output voltages given a specific DC bus voltage, controlling the rectifier to convert the supply voltage to DC voltage across the DC buses and so that the DC bus voltage is boosted to a level greater than the peak three phase AC input voltage; and controlling the inverter so that only the medium voltage vector switching states occur to convert a DC bus voltage to the AC output voltages provided to the load whereby the maximum inverter output voltage is reduced such that the maximum inverter output voltage is less than the maximum inverter output voltage during normal inverter operation and given a specific DC bus voltage.

23. A method for converting three phase AC input voltages on three supply lines to three phase AC output voltages supplied to a load where there is a rated drive output voltage, the method for reducing common mode voltage applied to the load and comprising the steps of:

linking a passive rectifier between an AC source and positive and negative DC buses;

linking a three phase, three-level PWM inverter between the DC buses and the load, the inverter capable of causing a plurality of switching states including a ppp state in which each of the three motor phases is linked to the positive DC bus and an nnn state wherein each of the three motor phases is linked to the negative DC bus; and controlling the inverter to provide AC voltages to the load such that the maximum inverter output voltage is substantially equal to the three-phase AC input voltage and so that the ppp and nnn switching states are excluded.

* * * * *